United States Patent [19]

Usami et al.

[11] Patent Number: 5,096,952
[45] Date of Patent: Mar. 17, 1992

[54] PRECIPITATION PREVENTING METHOD FOR SILICONE COMPOSITION

[75] Inventors: Ikuzo Usami, Tsukui; Takao Matsuyama; Yoshinori Sato, both of Sagamihara, all of Japan

[73] Assignee: Three Bond Co., Ltd., Tokyo, Japan

[21] Appl. No.: 687,383

[22] Filed: Apr. 18, 1991

[30] Foreign Application Priority Data

Apr. 19, 1990 [JP] Japan ............................. 2-101688

[51] Int. Cl.⁵ .............................................. C08K 5/06
[52] U.S. Cl. ..................................... 524/108; 524/588
[58] Field of Search ............................. 524/108, 588

[56] References Cited

U.S. PATENT DOCUMENTS 4,371,645  2/1983  Mahaffey .......................... 524/108
4,483,952  11/1984  Uchiyama ......................... 524/108

Primary Examiner—Paul R. Michl
Assistant Examiner—Tae H. Yoon
Attorney, Agent, or Firm—Scully, Scott, Murphy & Presser

[57] ABSTRACT

The precipitation of a filler containing silicone composition can be prevented by incorporating a condensation product of D-solbitol and benzaldehyde.

5 Claims, No Drawings

PRECIPITATION PREVENTING METHOD FOR SILICONE COMPOSITION

BACKGROUND OF THE INVENTION

The present invention relates to a precipitation preventing method for a silicone composition and more particularly to a method for preventing the precipitation or settling of fillers contained in a silicone composition, the caking of precipitated fillers, the loss of fluidity, etc.

Silicone compositions, or polyorganosiloxane compositions, are well known and have heretofore been used in various fields. As polyorganosiloxane compositions there are well known addition reaction type polyorganosiloxane compositions and condensation reaction type polyorganosiloxane compositions.

The former, addition reaction type polyorganosiloxane compositions, are of the type wherein a polyorganosiloxane having an alkenyl group and a polyorganosiloxane having a hydrogen atom bonded directly to a silicon atom are cured by using an addition reaction catalyst, e.g. a platinum compound.

The latter, condensation reaction type polyorganosiloxane compositions, are of the type wherein a polyorganosiloxane having a hydroxyl group and a hydrolyzable crosslinking agent are cured by using a tin compound for example.

Fillers are often added to these silicone compositions for imparting useful properties thereto and for reducing the cost.

Various filler-containing silicone compositions are known. For example, the silicone potting agent used for the embedding of electric and electronic parts possesses superior characteristics after curing such as high heat resistance, cold resistance, water resistance and moisture resistance, as as well as excellent shock absorbing property, electrical characteristics and heat conductivity, so is applied to various uses. Such conventional electronic parts as power transistors, diodes, coils and various printer heads generate heat during use, which may lead to deterioration of their characteristics or damage, so various silicones for heat radiation are used. Also, RTV silicone is used for sealing the flange surfaces in automobiles, construction machines, industrial robots, etc. from fluid.

The following are mentioned as examples of fillers highly effective for both addition reaction type and condensation reaction type (one-part, two-part) silicone compositions. Examples of heat-conductive fillers include such metal oxides as zinc oxide, aluminum oxide, feric oxide, titanium dioxide, and zirconium oxide; such metals as copper, copper alloy, aluminum, and iron. Further, in uses in which corrosion should be avoided, there are known highly heat-conductive ceramics such as graphite and silicon carbide.

Examples of other fillers which are used frequently include fumed silica (AEROJIL), precipitated silica, which enhances cured physical properties, tensile strength and tear strength, quartz powder, diatomaceous earth, calcium carbide, glass fiber, calcined clay, mica powder, potassium titanate, and chromium oxide. These may be used each alone or in combination of two or more.

Usually, silicone compositions are available commercially in one- or two-part form containing such fillers, catalyst, etc. Electrical characteristics, shock absorbing property, heat radiating property, as well as resistance to heat, cold moisture and chemicals, of the silicone compositions are enhanced by the fillers. However, since the fillers are incorporated in the silicone stock solution usually in a large amount of 30 to 70 wt %, if a treatment is performed to keep low the viscosity of the silicone composition used, that is, if priority is given to the easiness of use on the user side, the fillers will be precipitated and so it is necessary to make mixing and agitation at every use of the composition. Further, if the composition is stored for a long period in a distribution channel, the precification will proceed and cause caking of the fillers, thus resulting in that it becomes difficult to effect mixing and agitation at the time of use. On the other hand, increasing the viscosity for suppressing the precipitation will lead to the loss of fluidity and of the easiness of use on the user side.

SUMMARY OF THE INVENTION

The present invention has been accomplished in view of the above-mentioned circumstances and it is the object of the invention to provide an effective precipitation (incl. caking) preventing method for a filler-containing silicone composition without great increase of viscosity, thereby making it possible to use the same composition in a cartridge or an open can.

The present invention resides in a precipitation preventing method for a silicone composition, characterized by incorporating a condensation product of D-sorbitol and benzaldehyde in a filler-containing silicon composition to prepare a precipitation-preventable silicone composition.

DETAILED DESCRIPTION OF THE INVENTION

As the filler-containing silicone composition in the present invention there may be used any of the foregoing known liquid silicone compositions. In other words, any filler-containing polyorganosiloxane composition is employable in the invention if only the filler contained therein is likely to precipitate.

Examples of such polyorganosiloxane compositions include both of the foregoing addition reaction type and condensation reaction type. And both one- and two-part type of these compositions are employable.

No special limitation is placed on the viscosity of such filler-containing polyorganosiloxane compositions if only they are liquid compositions having fluidity in which the precipitation of the fillers causes a problem. For example, their viscosity can be selected in the range of 20 to 200,000 cP.

Also as to the filler, no special limitation is placed thereon, and the amount thereof is optional, depending on the purpose of use of the filler, but usually it is in the range of 30 to 70 wt % relative to the silicone stock solution, as noted previously.

The blending ingredient, which constitutes a characteristic feature of the present invention, is a condensation product of a sorbitol compound and a benzaldehyde compound, i.e., benzylidene sorbitol.

A commercially available product is employable as the blending ingredient. The amount thereof is preferaly 1 to 10 parts by weight based on 100 parts by weight of a liquid silicone composition containing a filler (and a catalyst). In the case of a two-part type silicone composition, it is preferabale that the blending ingredient be incorporated in both A and B liquids.

According to a preferred execution of the method of the method of the present invention, a filler-containing liquid silicone composition, or A and B which constitute said composition, and the condensation product referred to above, are compatibilized under heating, agitated and then cooled at room temperature, followed by further agitation into a homogeneously dispersed phase.

The silicone composition thus given a precipitation preventing property is used in a suitable form according to the purpose of use thereof. For example, it is used as a cartridge type sealant. In this case, A and B liquids are each charged into a cartridge, then the cartridges are attached to an automatic mixing system of the type in which mixing and injection are performed automatically as soon as the user presses and opens the cartridges using suitable means.

According to the method of the present invention, since the precipitation of fillers can be prevented while suppressing the increase of viscosity, it is no longer required to perform mixing and agitation just before use which have been considered necessary for the conventional sealants of the same type. Besides, the working efficiency is high and there are no variations in quation between lots.

The present invention will be described below on the basis of working Examples and Comparative Examples.

EXAMPLES AND COMPARATIVE EXAMPLES

The following are the contents of trade names of ingredients used: "GEL-OL D"
a condensation product of D-sorbitol and benzaldehyde (presumed to be a mixture of mono-, di- and tribenzylidene sorbitols in which dibenzylidene sorbitol is predominant) (a product of Shin Nippon Rika K.K.)
"COAGULAN GP-1"
Lauroyl glutamic dibutylamide (a product of Ajinomoto Co., Inc.)
"AEROJIL No. 200"
Fine powder of silica (a product of Nippon Aerojil K.K.)

The blending ingredients were added each 2 parts by by weight to 100 parts by weight of each of the following commercially available silicone compositions, followed by heating at 100°-150° C. (preferable 120° to 130°):

① TB 1230 A/b ... a two-part type, addition reaction type, polyorganosiloxane composition, for potting
② Toray Silicone SE 4410 A/B ... a two-part, addition reaction type, polyorganosiloxane composition, for heat radiation The mixtures thus treated were cooled to room temperatue, then agitated and mixed, and placed each 300 ml into a 300 ml graduated cylinder, followed by standing for 3 months, then observed for the state of separation on the basis of the following criterion:

○ ... no separation, 0 mm
△ ... separated supernatant liquid 5-10 mm
X ... separated supernatant liquid 10-20 mm
XX ... separated supernatant liquid 90 mm or more (blank)

Further, after foaming, a foamed state was checked along the following criterion:

○ ... good
△ ... ordinary
X ... bad
XX ... very bad

The results obtained

TABLE 1

| Silicone Composition | | Precipitation Preventing Agent | Sedimentatio | Hardness JISA | Heat Conductivity cal/cm · sec °C. | Evaluation |
|---|---|---|---|---|---|---|
| 1 Example | | Gel-ol D | ○ | 71 | 7.3 × 10⁻⁴ | ○ |
| 2 TB | Comparative | GP-1 | △ | 69 | 7.6 × 10⁻⁴ | X* |
| 3 1230 | Example | Aerojil No. 200 | X | 72 | 7.2 × 10⁻⁴ | X* |
| 4 A/B | | black | XX | 70 | 7.5 × 10⁻⁴ | X* |
| 5 Example | | Gel-ol D | ○ | 85 | 2.1 × 10⁻³ | ○ |
| 6 Toray Silicone | | GP-1 | △ | 86 | 2.0 × 10⁻³ | X* |
| 7 SE4410 | Comparative | Aerojil No. 200 | X | 89 | 2.4 × 10⁻³ | X* |
| 8 A/B | Example | blank | XX | 87 | 2.2 × 10⁻³ | X* |

*A/B were thoroughly mixed and agitated before curing
*The TB 1230 A/B compositions were all cured at 100° C. for 15 minutes and thereafter subjected measurement.

According to the method of the present invention, as is apparent from the comparison between Example (1 and 5) and Comparative Examples (the others), no precipitation is recognized, and the characteristics after curing are remarkably superior. Besides, the increase of viscosity after the addition of the blending ingredient was relatively small, and a high working efficiency was obtained.

What is claimed is:

1. A precipitation preventing method for a silicone composition, characterized by incorporating a condensation reaction product of D-sorbitol and benzaldehyde in a filler-containing silicone composition to prepare a precipitation-preventable silicone composition.

2. A method as set forth in claim 1, wherein said condensation reaction product principally comprises dibenzylidene sorbitol.

3. A method as set forth in claim 1, wherein the amount of said condensation reaction product added is in the range of 1% to 10% based on 100 parts by weight of said filler-containing silicone composition.

4. A method as set forth in claim 1, wherein the silicone is an addition reaction type polyorganosiloxane.

5. A method as set forth in claim 1, wherein the silicone is a condensation reaction type polyorganosiloxane.

* * * * *